(12) United States Patent
Makal et al.

(10) Patent No.: US 8,722,794 B2
(45) Date of Patent: *May 13, 2014

(54) MELT PROCESSABLE COPOLYETHERAMIDE ELASTOMERS

(75) Inventors: Umit G. Makal, Stow, OH (US); Bryce W. Steinmetz, Medina, OH (US); Roger W. Day, Solon, OH (US); Feina Cao, Copley, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/034,014

(22) Filed: Feb. 24, 2011

(65) Prior Publication Data

US 2011/0213076 A1    Sep. 1, 2011

Related U.S. Application Data

(60) Provisional application No. 61/309,076, filed on Mar. 1, 2010.

(51) Int. Cl.
*C08L 77/00* (2006.01)

(52) U.S. Cl.
USPC ........... 524/590; 524/714; 524/718; 524/720; 524/723; 525/434; 528/310

(58) Field of Classification Search
USPC ................. 524/590, 599, 714, 718, 720.723; 525/434; 528/310
See application file for complete search history.

(56) References Cited

U.S. PATENT DOCUMENTS

| | | | |
|---|---|---|---|
| 3,993,709 A | | 11/1976 | Hedrick et al. |
| 4,540,515 A | * | 9/1985 | van Geenen et al. ......... 540/451 |
| 4,540,516 A | * | 9/1985 | van Geenen et al. ......... 540/529 |
| 4,611,052 A | | 9/1986 | Vrinssen et al. |
| 4,614,615 A | | 9/1986 | Ashida et al. |
| 4,626,385 A | | 12/1986 | Ashida et al. |
| 4,673,722 A | | 6/1987 | Gardlund et al. |

FOREIGN PATENT DOCUMENTS

| | | |
|---|---|---|
| EP | 0135233 A1 | 3/1985 |
| EP | 0147792 A2 | 7/1985 |
| EP | 0159070 A1 | 10/1985 |
| EP | 0320070 B1 | 8/1993 |
| EP | 0357112 B1 | 9/1993 |
| WO | 94/17124 A1 | 8/1994 |

\* cited by examiner

*Primary Examiner* — Gregory Listvoyb

(74) *Attorney, Agent, or Firm* — Christopher D. Hilker

(57) ABSTRACT

The present invention relates to a melt processable copolyetheramide made by reacting (a) one or more segments of polyamide hard blocks derived from a lactam-terminated diisocyanate and a lactam monomer, and (b) one or more segments of polyether soft blocks derived from a polyether diol. The invention further provides for methods of making said copolyetheramide, including a continuous extruder method of production.

19 Claims, No Drawings

MELT PROCESSABLE COPOLYETHERAMIDE ELASTOMERS

CROSS REFERENCE

This application claims priority from Provisional Application Ser. No. 61/309,076 filed on Mar. 1, 2010.

BACKGROUND OF THE INVENTION

The present invention relates to melt processable copolyetheramide elastomers, and more specifically copolyetheramide elastomers that may be prepared in a continuous manner, including elastomers that may be prepared in a reactive extruder and/or similar equipment.

Thermoplastic polyamide elastomers, often referred to as PEBA, are high-performance and high-cost materials. PEBA materials have excellent resiliency and rebound properties as well as good hysteresis and chemical resistance. PEBA materials also have good low temperature impact properties. However, PEBA materials are also high cost materials due to the high cost of the raw materials used to prepare PEBA and the batch and semi-continuous methods of manufacturing PEBA. The high residence and/or reaction times needed to produce conventional PEBA materials have, to date, made continuous PEBA processing impractical.

There is a need for a PEBA material, or a PEBA-like material, that provides comparable and/or improved properties and characteristics but at lower overall cost. PEBA materials that can be produced continuously and/or in an internal mixing device, for example via reactive extrusion, would have significantly reduced production costs compared to conventional PEBA made via batch and semi-continuous methods. There is a need for a PEBA material, or a PEBA-like material, that may be processed continuously as well as the continuous process thereof.

SUMMARY OF THE INVENTION

The present invention provides a melt processable copolyetheramide elastomer comprising: (a) one or more segments of polyamide hard blocks derived from a lactam-terminated diisocyanate and a lactam monomer; and (b) one or more segments of polyether soft blocks derived from a hydroxy-terminated compound and/or derivatives thereof. The lactam-terminated diisocyanate used in the prepared of the elastomer contains less than 5% by weight residual lactam monomer. The term lactam-terminated diisocyanate as used herein refers to the reaction product of a diisocyanate and a lactam. In some embodiments, the lactam-terminated diisocyanate is derived from a lactam monomer and a diisocyanate substantially free of any diphenyl-containing diisocyanate where both phenyl rings of said diphenyl-containing diisocyanates are only para-substituted.

The elastomers of the present invention may be obtained by polymerizing (i) a lactam-terminated diisocyanate, (ii) a lactam monomer, and (iii) a hydroxy-terminated compound and/or derivatives thereof, optionally in the presence of a catalyst; wherein the polymerization takes place in an internal mixing apparatus; and wherein the molar ratio of the hydroxy-terminated compound to the lactam-terminated diisocyanate used in the polymerization is from 0.50 to 0.95.

The present invention further provides a process of preparing a melt processable copolyetheramide elastomer comprising the steps of: polymerizing (i) a lactam-terminated diisocyanate, (ii) a lactam monomer, and (iii) a hydroxy-terminated compound and/or derivatives thereof, optionally in the presence of a catalyst, wherein the polymerization takes place in an internal mixing apparatus wherein the lactam-terminated diisocyanate used in the preparation of the elastomer contains less than 5 percent by weight residual lactam monomer.

The present invention also provides where any of the described copolyetheramide elastomers are produced in a continuous and/or partially continuous manner as well as the continuous and/or partially continuous processes thereof.

The invention also relates to the articles of manufacture which may be prepared from the elastomers described above. Such articles may be manufactured by injection molding, compression molding and/or extrusion. Such articles may be manufactured using the procedures and techniques generally used with thermoplastic polymers.

DETAILED DESCRIPTION OF THE INVENTION

Various features and embodiments of the invention will be described below by way of non-limiting illustration.

The Copolyetheramide

The present invention provides a melt processable copolyetheramide elastomer. The elastomer includes at least one hard block segment and at least one soft block segment. Multiple hard block segments and soft block segments may be present. In some embodiments, the hard and soft blocks are arranged randomly.

The weight percent of hard block segments to soft block segments in the elastomer is not overly limited and may be adjusted to obtain the desired physical properties of the resulting elastomer. In some embodiments, the weight percent of hard block segments in the elastomer is from 10% to 90%, or from 10% to 60%, or from 20% to 40%.

The polyamide hard blocks may be derived from a lactam-terminated diisocyanate and a lactam monomer. The polyamide blocks include the possibly of a single amide block. In some embodiments, the hard blocks of copolyetheramide elastomer comprise polyamide blocks, amide blocks, or combinations thereof. Where the hard blocks are made up of both amide blocks and polyamide blocks, the hard blocks may be predominantly amide blocks, including the amide blocks making the polyamide blocks, more than 50%, 75% or even 80% amide blocks, with regards to all the blocks in the polymer.

The soft blocks are derived from one or more hydroxy-terminated compounds. Suitable hydroxy-terminated compounds include polyethers, polyesters, polycarbonates, polycaprolactones or combinations thereof. In some embodiments, the hydroxy-terminated compound is a polyether polyol, a polyester polyol, or combinations thereof. In some embodiments, the hydroxy-terminated compound has a number average molecular weight (Mn) from 200 to 10,000, or from 400 or 600 to 5,000 or 2,000. In other embodiments, the hydroxy-terminated compounds comprises a polyether and/or polyester diol of the general formula HO—(RO)$_n$—H wherein R is a hydrocarbyl group, which may contain a carbonyl group in the hydrocarbyl chain, where the hydrocarbyl group contains a total of from 1 to 20 carbon atoms, or from 1 or 2 or 4 to 8 or 6 or 4 carbon atoms, and n is an integer from 1 to 70 or from 2 or 4 to 50 or 40 or 20 carbon atoms.

In some embodiments, the elastomer contains polyether derived soft blocks. In other embodiments, the elastomer contains polyester derived soft blocks. In still other embodiments, the elastomer contains a mixture of ether and ester units. In such embodiments, the soft blocks may be predominantly polyether blocks, more than 70%, 80% or even 90% polyether blocks. In some embodiments, the soft blocks are substantially free of polyester groups and/or contain less than 10%, 5% or even 1% polyester groups.

The copolyetheramide elastomers of the present invention may have a melt index (and/or melt flow index), as measured by ASTM D1238 (or some comparable method), of from 5 to 50 grams/10 minutes, measured at 200 degrees C. and under 3800 grams of weight.

The Lactam-Terminated Diisocvanate

As noted above, the hard blocks of the copolyetheramide elastomers of the present invention may be derived from a lactam-terminated diisocyanate and a lactam monomer. The lactam-terminated diisocyanate may be derived from an alkylene diisocyanate. In some embodiments, the lactam-terminated diisocyanate is terminated with one or more of lactam monomers described below. In some embodiments, the lactam-terminated diisocyanate is terminated with caprolactam, laurolactam, or a combination thereof. To be clear, the lactam-terminated diisocyanate of the invention is not itself a diisocyanate, rather it is derived from a diisocyanate. As described herein, it is derived from a diisocyanate and two lactam monomers, where the one lactam monomer attaches to each end of the diisocyanate. For example, the lactam-terminated diisocyanate of the invention may have the general structure: $R^1$—C(O)—N($R^2$)—C(O)—N(H)—$R^3$—N(H)—C(O)—N($R^4$)—C(O)—$R^5$ where each $R^1$, $R^2$, $R^4$ and $R^5$ is a alkylene group where $R^1$ and $R^2$ are linked to form a cyclic group and $R^4$ and $R^5$ are linked to form a cyclic group, and where $R^3$ is an alkylene group. In some embodiments, $R^1$ and $R^2$ combined contain 5 carbon atoms forming a linear portion of the cyclic group, $R^4$ and $R^5$ combined contain 5 carbon atoms forming a linear portion of the cyclic group, and R3 contains 6 carbon atoms, and in some embodiments is linear.

The diisocyanates useful in the preparation of the lactam-terminated diisocyanate are not overly limited. In some embodiments, suitable diisocyanates include 4,4'-methylenebis-(phenyl isocyanate); hexamethylene diisocyanate; 3,3'-dimethylbiphenyl-4,4'-diisocyanate; m-xylylene diisocyanate; phenylene-1,4-diisocyanate; naphthalene-1,5-diisocyanate; diphenylmethane-3,3'-dimethoxy-4,4'-diisocyanate; toluene diisocyanate; isophorone diisocyanate; 1,4-cyclohexyl diisocyanate; decane-1,10-diisocyanate; dicyclohexylmethane-4,4'-diisocyanate; or combinations thereof. One or more of these diisocyanates may be terminated with lactam monomer to provide the lactam-terminated diisocyanates of the present invention.

In some embodiments, the lactam-terminated diisocyanates of the present invention includes caprolactam-terminated hexamethylene diisocyanate, caprolactam-terminated methylene diphenyl diisocyanate, caprolactam-terminated dicyclohexylmethane diisocyanate, caprolactam-terminated toluene diisocyanate, or combinations thereof. In other embodiments, the lactam-terminated diisocyanate comprises caprolactam-terminated hexamethylene diisocyanate, caprolactam-terminated dicyclohexylmethane diisocyanate, caprolactam-terminated toluene diisocyanate, or combinations thereof, where the lactam monomer comprises caprolactam, laurolactam or combinations thereof, and the hydroxy-terminated compound comprises polytetramethylene ether glycol.

The lactam-terminated diisocyanate may be prepared by techniques and methods known by those skilled in the art. For example, lactam-terminated diisocyanate may be prepared by the reaction of a diisocyanate, including one or more the diisocyanates described above, with a lactam monomer, including one or more of the lactam monomers described above. The reaction may be carried out at an elevated temperature, such as 85 degrees C. with stirring. The reaction may also be carried out under a nitrogen purge. A catalyst may be used in the preparation of the lactam-terminated diisocyanate. The molar ratio of diisocyanate to lactam monomer used in the preparation of the lactam-terminated diisocyanate is not overly limited and generally depends on the diisocyanate and lactam monomer used. In some embodiments, the molar ratio of diisocyanate to lactam monomer used in the preparation of the lactam-terminated diisocyanate is from 1:0.5 to 1:5 or from 1:1.5 to 1:5. In some embodiments, the ratio is roughly 2 moles of lactam monomer for every mole of diisocyanate with the allowance for some excess of lactam monomer to drive the reaction to completion. The resulting lactam-terminated diisocyanate may then be used to prepare the copolyetheramide elastomers of the present invention.

In some embodiments, the lactam-terminated diisocyanate used in the preparation of the elastomer contains less than 5 percent by weight residual lactam monomer. 4,4'-methylene diphenyl diisocyanate (MDI) is a suitable diisocyanate for use in the present invention, however, in some embodiments, MDI is used in combination with one or more other diisocyanates, and make up no more than 50%, 25%, or even 10% by weight of the combined amount of diisocyanates used.

In still other embodiments, the lactam-terminated diisocyanate is derived from a lactam monomer and a diisocyanate substantially free of any diphenyl-containing diisocyanate where both phenyl rings of said diphenyl-containing diisocyanates are only para-substituted. In some embodiments, the diisocyanate used in the present invention include a diisocyanate having one para-substituted ring and on meta and/or ortho-substituted ring. In some embodiments, the diisocyanates of the present invention contain 2 or less elements of symmetry. In some embodiments, the diisocyanate component of the invention is substantially free of, to free of, diphenyl diisocyanates, or even specifically MDI.

The Lactam Monomer

The lactam monomers utilized in preparation of the lactam-terminated diisocyanates of the present invention are not overly limited. In some embodiments, the lactam monomer is an n-alkanelactam in which n is an integer and is chosen from 2 up to and including 12. More, in particular, the n-alkanelactam is 2-ethanelactam (azacyclopropan-2-one), 3-propanelactam (propiolactam), 4-butanelactam (butyrolactam or 2-pyrrolidone), 5-pentanelactam (valerolactam), 3-methylvalerolactam, 6-methylvalerolactam, 6-hexanelactam (caprolactam), 7-heptanelactam (enantholactam, 8-octanelactam (caprylolactam), 9-nonanelactam (pelargolactam), 10-decanelactam (caprinolactam), 11-undecanelactam or 12-dodecanelactam (laurolactam).

In some embodiments, the lactam monomer is caprolactam, laurolactam or a combination thereof. In some embodiments, the lactam monomer is caprolactam.

It is possible to prepare some of the copolyetheramide elastomers of the present invention without the use of a lactam monomer. That is, some of copolyetheramide elastomers of the present invention are derived from the polymerization of a lactam-terminated diisocyanate and a polyether diol. Such elastomers are contemplated by the present invention, such that in some embodiments, the lactam monomer, as a separate reaction component, is an optional component.

The Hydroxy-Terminated Compound

As noted above, the soft blocks of the copolyetheramide elastomers of the present invention are derived from a hydroxy-terminated compound and/or derivatives thereof. Suitable hydroxy-terminated compounds include polyethers, polyesters, polycarbonates, polycaprolactones or combinations thereof. This component may also be referred to as the polyol component.

In some embodiments, the hydroxy-terminated compound comprises a polyether diol. Polyether diols useful in the present invention include polyethylene glycol, polypropylene glycol, poly(tetramethylene ether)glycol, poly(trimethylene ether)glycol, copolymers of two or more of said diols, or combinations thereof. In some embodiments, the polyether diol includes poly(tetramethylene ether) glycol. Poly(tetramethylene ether) glycol is also known as poly THF and/or poly tetrahydrofuran.

In some embodiments, the copolyetheramide elastomer of the present invention is derived from (i) a lactam-terminated diisocyanate component that includes caprolactam-terminated hexamethylene diisocyanate, caprolactam-terminated methylene diphenyl diiso cyanate, caprolactam-terminated dicyclohexylmethane diisocyanate, caprolactam-terminated toluene diisocyanate, or combinations thereof; (ii) a lactam monomer component that includes caprolactam, laurolactam or combinations thereof; and (iii) a polyether diol component that includes poly(tetramethylene ether)glycol.

In some embodiments, the hydroxy-terminated compound comprises a polyester diol. Suitable polyester polyols may be derived from at least one dialkylene glycol and at least one dicarboxylic acid, or an ester or anhydride thereof. The polyester polyols are generally a substantially linear, or linear, polyester having a number average molecular weight (Mn) of from about 500 to about 10,000, from about 500 to about 5000, or from about 1000 to about 3000, or even about 2000. Suitable polyester polyols include ethylene and diethylene glycol adipates, butanediol adipate, polytetramethylene glycol adipate, hexanediol adipate, and the polyols produced from terephthalate and derivatives thereof, including, for example, dimethyl terephthalate or the digestion product of polyethylene terephthalate, reacted with diols and triols. The hydroxy-terminated compound may even be a polylactone reacted with a diol and/or an epoxide.

In some embodiments, the hydroxy-terminated compounds are substantially free of to free of polyesters, polycarbonates, and/or polycaprolactones. By substantially free of, it is meant that the hydroxy-terminated compound contains less than 10% by weight of the compound in question, or less than 5%, 1% or even 0.5% by weight of the compound in question. In such embodiments, the elastomers of the present invention contain polyether polyol derived soft blocks and are substantially free of to free of soft block derived from polyesters, polycarbonates, and/or polycaprolactones.

In some embodiments, the soft segments of the elastomers of the present invention may also be derived from amine-terminated compounds such as amine-terminated polyether polyols. Such compounds are considered to be derivatives of the hydroxy-terminated compound described above. In some embodiments, such amine-terminated compounds may be used instead of or in combination with the other hydroxy-terminated compounds detailed above. In other embodiments, the soft segments of the elastomers of the present invention are substantially free to free of units derived from these amine-terminated compounds.

In some embodiments, the hydroxy-terminated compound includes polytetramethylene ether glycol having a number average molecular weight (Mn) of no more than 2000, 1000, 650 or instead may have a Mn of 500 to 2000, 500 to 1500, or 650 to 1000. In some embodiments, the hydroxy-terminated compound includes polytetramethylene ether glycol, and may even contain enough polytetramethylene ether glycol such that this material accounts for at least 30%, 50%, 80%, 90% or even 95% of the hydroxy-terminated component. In other embodiments, the optional polyol component is poly (tetramethylene ether) glycol, and may be substantially free of any other polyols.

In some embodiments, the hydroxy-terminated compound includes a polyether diol of the general formula HO—(RO)$_n$—H wherein R is a hydrocarbyl group containing from 1 to 20 carbon atoms and n is an integer from 1 to 50 or even 1 to 10. In some embodiments, R contains from 2 or 4 to 6 or 8 carbon atoms.

The Chain Extender

In some embodiments, any of the polymerizations described above may further include (iv) a chain extender, which may be included as part of the polyol component, or which may be treated as a separate component. Suitable chain extenders include glycols and can be aliphatic, aromatic or combinations thereof. In some embodiments, the chain extenders are glycols having from 2 to about 12 carbon atoms.

In some embodiments, the glycol chain extenders are lower aliphatic or short chain glycols having from about 2 to about 10 carbon atoms and include, for instance: ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, neopentylglycol, and the like. In some embodiments, the chain extender includes 1,4-butanediol.

Aromatic glycols may also be used as the chain extender to make the TPU including benzene glycol and xylene glycol, also known as xylylene glycol. Xylene glycol is a mixture of 1,4-di(hydroxymethyl)benzene and 1,2-di(hydroxymethyl) benzene. Benzene glycol specifically includes hydroquinone, bis(beta-hydroxyethyl)ether also known as 1,4-di(2-hydroxyethoxy)benzene; resorcinol, bis(beta-hydroxyethyl) ether also known as 1,3-di(2-hydroxyethyl)benzene; catechol, bis(beta-hydroxyethyl)ether also known as 1,2-di(2-hydroxyethoxy)benzene; and combinations thereof.

A mixture of two or more glycols may be used as the chain extender. In some embodiments, the chain extender is a mixture of 1,4-butanediol and 1,6-hexanediol. In other embodiments, one or more of the chain extenders listed may be excluded from the present invention.

Diamines may also be used as a chain extender, as is well known in the art. In one embodiment of the present invention, the chain extender contains a diamine as a co-chain extender in combination with one or more of the chain extenders described above. In other embodiments, the present invention does not use any diamines in the preparation of its compositions.

When this optional chain extender is present, it may be added to the other materials at any time, however in some embodiments, during the polymerization process, the chain extender is added to the reaction mixture after the combination of components (i) and (ii). The chain extender may be added before the addition of component (iii), after the addition of component (iii), or even at the same time as component (iii), with concurrent addition or even mixing the chain extender with the component.

Additional Additives.

The compositions of the present invention may further include additional useful additives, where such additives can be utilized in suitable amounts. These optional additional additives include opacifying pigments, colorants, mineral and/or inert fillers, stabilizers including light stabilizers, lubricants, UV stabilizers (including UV absorbers), processing aids, antioxidants, anti-ozonates, and other additives as desired. Useful additional additives also include nanoparticles, nanotubes, impact modifiers, flame retardants, conductive polymers, static dissipative materials, and combinations thereof.

Suitable opacifying pigments include titanium dioxide, zinc oxide, and titanate yellow. Suitable tinting pigments include carbon black, yellow oxides, brown oxides, raw and burnt sienna or umber, chromium oxide green, cadmium pigments, chromium pigments, and other mixed metal oxide and organic pigments. Suitable fillers include diatomaceous earth (superfloss) clay, silica, talc, mica, wallostonite, barium sulfate, and calcium carbonate. If desired, stabilizers such as antioxidants can be used and include phenolic antioxidants, while useful photo stabilizers include organic phosphates, and organotin thiolates (mercaptides). Suitable lubricants include metal stearates, paraffin oils and amide waxes. Suitable UV absorbers include 2-(2'-hydroxyphenol) benzotriazoles and 2-hydroxybenzophenones. Additives can also be used to improve the hydrolytic stability of the TPU polymer. Each of these optional additional additives described above may be present in, or excluded from, the compositions of the present invention.

When present, these additional additives may be present in the compositions of the present invention from 0 or 0.01 to 5 or 2 weight percent of the composition. These ranges may apply separately to each additional additive present in the composition or to the total of all additional additives present.

The Process

The copolyetheramide elastomers of the present invention may be obtained by polymerizing a lactam-terminated diisocyanate; a polyether diol; and optionally a lactam monomer, where each component is described above. This polymerization may be carried out in the presence of a metal-containing catalyst, such as a metal-containing caprolactamate catalyst.

In some embodiments, the polymerization is carried out by first polymerizing a lactam-terminated diisocyanate; and a polyether diol. The resulting intermediate may then be optionally further polymerized with: a lactam monomer.

In other embodiments, the polymerization is carried out by first polymerizing a lactam-terminated diisocyanate; and the optional lactam monomer. The resulting intermediate may then be further polymerized with: a polyether diol.

In still other embodiments, the polymerization may be carried out by simultaneously polymerizing all three components at once but it is believed that the multi-step reaction process, specifically, reacting the a lactam-terminated diisocyanate with a polyether diol, optionally in the presence of a catalyst, and then further reacting the resulting intermediate with a lactam monomer, also optionally in the presence of a catalyst, provides the best results. In particular, such compositions generally provide superior crystallinity properties.

In any of the embodiments described above, the polymerizations involved may be carried out in the presence of a catalyst. Suitable catalysts include alkaline catalysts, Lewis acid catalysts, as well as other catalysts known to those skilled in the art. In some embodiments, the catalyst used during the polymerization is an alkaline catalyst and/or a metal-containing caprolactamate catalyst. In some embodiments, the catalyst used includes sodium caprolactamate also known as sodium caprolactam, potassium caprolactamate also known as potassium caprolactam, magnesium caprolactamate also known as magnesium caprolactam, or combinations thereof. In some embodiments, the catalyst includes sodium caprolactamate.

Where a catalyst is used, the process of making the copolyetheramide elastomers of the present invention may further include the addition of a catalyst deactivator. After such an addition, the process may then include one or more steps for the removal of any remaining catalyst and/or catalyst deactivator from the resulting material. Conventional catalyst deactivators, as well as the methods of adding and removing such materials, are compatible with the materials and process of the present invention.

The polymerization described above may be carried out in an internal mixing apparatus, including a continuous processing internal mixing apparatus. Examples include reactive extruders and similar equipment. The equipment used in the processes of the present invention may include batch equipment, continuous equipment, or combinations thereof. In some embodiments, the processes of the present invention are at least partially continuous and in other embodiments the processes are fully continuous. The processes may also include the use of one or more extruders, either in series or parallel, in order to produce the materials described above.

In some embodiments, the materials of the present invention are prepared in one or more twin screw extruders. Suitable twin screw extruders include co-rotating twin screw extruders as well as series of such extruders.

In some embodiments, the processes of the present invention, where lactam monomer is present as a reaction component, further comprise the step of removing any residual lactam monomer from the resulting copolyetheramide elastomer composition. In addition, the process may include a step to remove any volatile component which may be present, whether it is a lactam monomer, a solvent or similar temporary component, or some other material present in the composition during the reaction and/or subsequent processing. Such steps may use thin film evaporation, falling film evaporation, wiped film evaporation, or combinations thereof to accomplish the removal. In addition, any substantially similar processing equipment and steps may be used for the removal step.

As noted above, the copolyetheramide elastomers of the present invention may include one or more performance additives. These additives, when present, may be added before, during and/or after the polymerization, resulting in a composition comprising the copolyetheramide elastomer and one or more of the performance additives.

In some embodiments, the copolyetheramide elastomers of the present invention may be prepared by feeding the lactam-terminated diisocyanate and the polyether diol into a first internal mixer. The optional chain extender may be added to the first internal mixer, and may even be premixed with the polyether diol. In other embodiments, the polyether diol, optional chain extender and lactam-terminated diisocyanate may be premixed before entering the first internal mixer. The optional catalyst may also be added to the first internal mixer. The resulting material that exits the first internal mixer may be fed into a second internal mixer. Lactam monomer, when present as a separate reactant component, may be added to the second internal mixer. In addition, the optional catalyst may be added to the second internal mixer, instead of or in addition to its addition to the first internal mixer. In some embodiments, the lactam monomer may be added to the first internal mixer. In such embodiments, the lactam monomer may be added separately, or premixed with one or more of the other reactants, including a premix of all of the reactants before entering the first internal mixer. Performance additives, in the form of liquids and/or powders, may be added to the first and/or second internal mixer and in some embodiments the second internal mixer, typically further down the screw in the case of an extruder. Vacuum may be applied near the exit of the second internal mixer, to remove volatile components, and other steps described above may be included as well. The resulting copolyetheramide elastomer exiting the second internal mixer may be sent through a water bath and/or may pass through a size reduction device, such as a strand cutter or under water pelletizer. The first internal mixer may operate from 70 to 200, from 70 to 140, or 150 or even from 70 to 120 degrees C. The second internal mixer may operate from 70 to 250 or from 100 to 200 degrees C. The reactants may be added at ambient temperatures, but typically are added at elevated temperatures. The first and second internal mixers may also each be made up of multiple internal mixers, or in other embodiments, may be different segments of a single large internal mixer.

In some embodiments, the copolyetheramide elastomers of the present invention may be prepared by feeding the lactam-terminated diisocyanate and the lactam monomer into a first internal mixer. The optional chain extender may be added to the first internal mixer, and may even be premixed with the lactam monomer. In other embodiments, the lactam monomer, optional chain extender and lactam-terminated diisocyanate may be premixed before entering the first internal mixer. The optional catalyst may also be added to the first internal mixer. The resulting material that exits the first internal mixer may be fed into a second internal mixer. The polyether diol may be added to the second internal mixer. In addition, the optional catalyst may be added to the second internal mixer, instead of or in addition to its addition to the first internal mixer. In some embodiments, the polyether diol may be added to the first internal mixer. In such embodiments, the polyether diol may be added separately, or premixed with one or more of the other reactants, including a premix of all of the reactants before entering the first internal mixer. Performance additives, in the form of liquids and/or powders, may be added to the first and/or second internal mixer and in some embodiments the second internal mixer, typically further down the screw in the case of an extruder. Vacuum may be applied near the exit of the second internal mixer, to remove volatile components, and other steps described above may be included as well. The resulting copolyetheramide elastomer exiting the second internal mixer may be sent through a water bath and may also pass through a size reduction device, including a strand cutter or under water pelletizer. The first internal mixer may operate from 70 to 200, from 70 to 150 or even from 70 to 120 degrees C. The second internal mixer may operate from 70 to 250 or from 100 to 200 degrees C. The reactants may be added at ambient temperatures, but typically are added at elevated temperatures. The first and second internal mixers may also each be made up of multiple internal mixers, or in other embodiments, may be different segments of a single large internal mixer.

The copolyetheramide elastomer described herein may be prepared by polymerizing (i) a lactam-terminated diisocyanate, (ii) a lactam monomer, and (iii) a hydroxy-terminated compound and/or derivatives thereof, optionally in the presence of a catalyst. The polymerization may take place in an internal mixing apparatus, and the amount of the components may be set such that the molar ratio of the hydroxy-terminated compound to the lactam-terminated diisocyanate used in the polymerization is from 0.50 to 0.95, or from 0.70 to 0.90, or from 0.70 to 0.80 or from 0.75 to 0.80, or even about 0.75.

The copolyetheramide elastomer described herein may be used in the preparation of shaped polymer articles. The specific types of articles the copolyetheramide elastomer described herein are useful for are not overly limited.

In some embodiments, the molar ratio of the polyol component to the lactam-terminated diisocyanate is from 0.65:1 to 0.85:1, or even from 0.70:1 to 0.80. In some of these embodiments the polyol component, sometimes referred to as a hydroxy-terminated compound herein, includes polytetramethylene ether glycol, for example polytetramethylene ether glycol having a molecular weight of 500 to 3000, or from 600, 650, or 750 up to 2000, 1500, or even 1000. In some of these embodiments, the lactam-terminated diisocyanate includes the reaction product of a diisocyanate, for example, hexamethylene diisocyanate and a lactam monomer, for example, caprolactam, which may be referred to as HDI-BisCapro, or HBC. In any of these embodiments, the hard segment percent (a percentage calculated by taking the weight of lactam monomer used in the preparation of the copolymer and dividing it my the combined total of the weights of lactam momomer, polyol component and lactam-terminated diisocyanate used in the formulation, and then multiplying that number by 100 to give a percentage value) may be more than 20%, more than 25%, at least 30%, at least 40%, up to 60% or even 50%. In some embodiments, the hard segment percent is about 30%, about 50%, or from about 30% to about 50%.

In some embodiments, the polyol component may be a blend of two or more polyols. For example, the polyol component may be a blend of polytetramethylene ether glycol and another polyether diol. In some embodiments, the polyol component is at least 70% by weight polytetramethylene ether glycol, or even at least 75% or 80% polytetramethylene ether glycol. Any of the molar ratios of the polyol component to the lactam-terminated diisocyanate described above may be applied here as well.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by mixing the components described above.

EXAMPLES

The invention will be further illustrated by the following examples, which sets forth particularly advantageous embodiments. While the examples are provided to illustrate the present invention, they are not intended to limit it.

Example Set 1

A set of examples is prepared using a batch process in a lab.

Example 1-1

A copolyetheramide elastomer is prepared in two steps. During the first step, a soft segment is prepared by reacting, in an internal mixing apparatus, a lactam-terminated diisocyanate (itself prepared by reacting 25.27 mmol of hexamethylene diisocyanate and 54.33 mmol of caprolactam monomer) with 22.62 mmol of polytetramethylene ether glycol (PTMEG 2000) in the presence of a sodium caprolactamate catalyst (0.31 mmol), where the reaction is carried out at 90 to 95 degrees C. In the second step, the hard segments are formed by adding a lactam monomer to react with the soft segment of the first step. For the second step, the reaction temperature is increased to 150° C. and 209.17 mmol molten caprolactam is added to the soft segment from the first step, with additional sodium caprolactamate catalyst (2.79 mmol). The resulting material is compression molded for analysis.

Example 1-2

A copolyetheramide elastomer is prepared in two steps. During the first step, a soft segment is prepared by reacting, in an internal mixing apparatus, a lactam-terminated diisocyanate (itself prepared by reacting 23.72 mmol of hexamethylene diisocyanate and 50.29 mmol of caprolactam monomer) with 22.53 mmol of polytetramethylene ether glycol (PTMEG 2000) in the presence of a sodium caprolactamate catalyst (0.32 mmol), where the reaction is carried out at 90 to 95 degrees C. In the second step, the hard segments are formed by adding a lactam monomer to react with the soft segment of the first step. For the second step, the reaction temperature is increased to 150° C. and 259.04 mmol molten caprolactam is added with additional sodium caprolactamate catalyst (3.45 mmol). The resulting material is compression molded for analysis.

Example 1-3

A copolyetheramide elastomer is prepared in two steps. During the first step, a soft segment is prepared by reacting, in an internal mixing apparatus, a lactam-terminated diisocyanate (itself prepared by reacting 35.44 mmol of hexamethylene diisocyanate and 76.20 mmol of caprolactam monomer) with 32.61 mmol of polytetramethylene ether glycol (PTMEG 2000) in the presence of a sodium caprolactamate catalyst (0.47 mmol), where the reaction is carried out at 90 to 95 degrees C. In the second step, the hard segments are formed by adding a lactam monomer to react with the soft segment of the first step. For the second step, the reaction temperature is increased to 150° C. and 233.63 mmol molten caprolactam is added with additional sodium caprolactamate catalyst (3. mmol). The resulting material is compression molded for analysis.

Example 1-4

A copolyetheramide elastomer is prepared in two steps. During the first step, a soft segment is prepared by reacting, in an internal mixing apparatus, a lactam-terminated diisocyanate (itself prepared by reacting 32.40 mmol of hexamethylene diisocyanate and 69.66 mmol of caprolactam monomer) with 29.81 mmol of polytetramethylene ether glycol (PTMEG 1000) in the presence of a sodium caprolactamate catalyst (0.43 mmol), where the reaction is carried out at 90 to 95 degrees C. In the second step, the hard segments are formed by adding a lactam monomer to react with the soft segment of the first step. For the second step, the reaction temperature is increased to 150° C. and 161.53 mmol molten caprolactam is added with additional sodium caprolactamate catalyst (2.15 mmol). The resulting material is compression molded for analysis.

Example 1-5

A copolyetheramide elastomer is prepared in two steps. During the first step, a soft segment is prepared by reacting, in an internal mixing apparatus, a lactam-terminated diisocyanate (itself prepared by reacting 29.31 mmol of hexamethylene diisocyanate and 63.02 mmol of caprolactam monomer) with 26.97 mmol of polytetramethylene ether glycol (PTMEG 1000) in the presence of a sodium caprolactamate catalyst (0.39 mmol), where the reaction is carried out at 90 to 95 degrees C. In the second step, the hard segments are formed by adding a lactam monomer to react with the soft segment of the first step. For the second step, the reaction temperature is increased to 150° C. and 227.09 mmol molten caprolactam is added with additional sodium caprolactamate catalyst (3.03 mmol). The resulting material is compression molded for analysis.

Example Set 2

A set of examples is prepared using a lab scale Brabender, an internal mixing device, to prepare the examples. Each example is prepared by starting with an intermediate reaction product, itself prepared from hexamethylene diisocyanate and caprolactam. This reaction product may be called N,N'-(hexane-1,6-diyl)bis(2-oxoazepane-1-carboxamide), and is referred to as HDI-BisCapro, or HBC, herein. The same HBC material is used in the preparation of each of the examples in this set.

In each example, the polyol component, in this set PTMG 1000, a commercially available poly(tetramethylene oxide) having a molecular weight of about 1000, and molten HBC is added into Brabender chamber, followed by the addition of the first shot of catalyst at 100° C. The rotation speed is set to 100 rpm. When the temperature reaches 140° C., molten caprolactam is added and the second shot of catalyst is injected. The catalyst added at both points in the process is the same material, a sodium caprolactamate catalyst. Once the torque level in the machine levels off and the temperature reaches 170-180° C., the machine is stopped and the resultant material is removed and sampled. Melting points ($T_m$) were determined by differential scanning calorimetry (DSC) with temperature range from −100° C. to 250° C. at 10° C./minute heating and cooling rates. Glass transition temperature ($T_g$) was determined by dynamic mechanical analysis (DMA) under torsion mode with frequency of 1 Hz and strain of 0.1%. The temperature range was from −100° C. to 250° C. at 2° C./step. Many of the examples were also each pressed into a molded plaque to check for phase separation (PS) of the composition. A rating of "No PS" indicates the plaque appeared uniform and mechanically strong (i.e., shows good elastomeric properties), a rating of "PS" indicates the plaque showed signs of phase separation, for example showing an opaque to white appearance and/or weak mechanical properties (i.e., becomes very rigid or plastomeric). A rating of "slight PS" indicates some level minor of phase separation were observed. It is noted that all elastomeric materials are considered to be micro-phase separated. These observations are directed to macro-phase separations that inhibit the elastomeric properties of the examples. In addition, for each example a hard segment weight percent is provided (HS %). This value is calculated by taking the weight of caprolactam used in the formulation and dividing it the combined total of weight of caprolactam, polyol component and HBC used in the formulation, and then multiplying that number by 100 to give a percentage value. The formulations of the examples in this set are summarized in the table below, along with the results obtained from each example.

TABLE 1

Example Set 2 Formulations and Results

|  | 2-A | 2-B | 2-C | 2-D | 2-E | 2-F | 2-G | 2-H |
|---|---|---|---|---|---|---|---|---|
| HBC (g) | 15.82 | 17.16 | 18.09 | 18.74 | 20.65 | 22.99 | 21.62 | 24.79 |
| Polyol Component (g) | 36.02 | 34.72 | 34.33 | 33.19 | 31.34 | 29.08 | 21.88 | 18.81 |
| Catalyst-1 (g) | 1.41 | 1.36 | 1.34 | 1.3 | 1.22 | 1.14 | 0.85 | 0.73 |
| Caprolactam (g) | 22.08 | 22.09 | 22.31 | 22.09 | 22.1 | 22.12 | 18.46 | 18.47 |
| Catalyst-2 (g) | 3.88 | 4.88 | 3.92 | 4.88 | 5.88 | 5.88 | 12.48 | 17.49 |
| Hard Segment, HS % (%) | 30 | 30 | 30 | 30 | 30 | 30 | 30 | 30 |
| Polyol/HBC Ratio (m/m) | 0.9 | 0.8 | 0.75 | 0.7 | 0.6 | 0.5 | 0.4 | 0.3 |
| $T_m$ (° C.) | — | 21; 167 | 22; 170 | 21; 166 | 23; 170 | 23; 171 | 22; 170 | — |
| HS Melting ΔH (J/g) | — | 8.6 | 11.3 | 9.0 | 9.0 | 11.2 | 13.8 | — |
| $T_c$ (° C.) | — | −15; 110 | −15; 105 | −15; 106 | −14; 99 | −14; 95 | −12; 81; 117 | — |
| HS Cryst ΔH (J/g) | — | 6.9 | 10.1 | 8.7 | 3.4 | 2.9 | 1.3 | — |
| Molded Plaque Observ | Slight PS | No PS | No PS | No PS | No PS | Slight PS | No PS | PS |

The results show that the hard segment crystallinity is dependent on the ratio of polyol component to HBC. Higher crystallinity may be achieved when certain ratios are used.

Example Set 3

A set of examples is prepared and tested using the same equipment, procedures and test methods described in Example Set 2 above. However, in this example set, a different polyol component is used. These examples use PTMG 650, a commercially available poly(tetramethylene oxide) having a molecular weight of about 650, and include examples that vary the hard segment content (the segments of the resulting copolymer that are derived from the caprolactam that is reacted with the HBC-polyol component reaction product) as well was examples that vary the ratio of the polyol component to the HBC. The formulations of the examples in this set are summarized in the table below, along with the results obtained from each example.

TABLE 2

Example Set 3 Formulations and Results

|  | 3-A | 3-B | 3-C | 3-D | 3-E | 3-F | 3-G |
|---|---|---|---|---|---|---|---|
| HBC (g) | 30.51 | 26.78 | 23.14 | 19.60 | 16.13 | 17.45 | 15.24 |
| Polyol Component (g) | 38.32 | 33.64 | 29.07 | 24.61 | 20.26 | 18.99 | 21.7 |
| Catalyst-1 (g) | 2.26 | 1.98 | 1.71 | 1.45 | 1.19 | 1.12 | 1.28 |
| Caprolactam (g) | 7.58 | 14.97 | 22.18 | 29.21 | 36.07 | 36.1 | 36.63 |
| Catalyst-2 (g) | 1.33 | 2.63 | 3.90 | 5.13 | 6.34 | 6.34 | 5.15 |
| Hard Segment (%) | 10 | 20 | 30 | 40 | 50 | 50 | 50 |
| Polyol/HBC Ratio (m/m) | 0.75 | 0.75 | 0.75 | 0.75 | 0.75 | 0.65 | 0.85 |
| $T_m$ (° C.) | 13; 147 | 13; 155 | 16; 177 | 17; 179 | 16; 182 | 18; 187 | 17; 188 |
| HS Melting ΔH (J/g) | 6 | 8 | 17 | 17 | 17 | 22 | 21 |
| $T_c$ (° C.) | −50; 69 | −42; 86 | −26; 134 | −28; 125 | −22; 131 | −20; 134 | −22; 136 |
| HS Cryst ΔH (J/g) | 4 | 6 | 18 | 20 | 20 | 26 | 26 |
| $T_g$ (° C.) by DMA | −58 | −56 | −56 | −62 | −60 | −64 | −64 |

The results show that the hard segment crystallinity is dependent on the ratio of polyol component to HBC. Higher crystallinity may be achieved when certain ratios are used and that the hard segment content also impacts crystallinity.

Example Set 4

A set of examples is prepared and tested using the same equipment, procedures and test methods described in Example Set 2 above. However, in this example set, a different polyol component is used. These examples use a polyol blend that is a mixture of PTMG 1000, as described above, and POLY G® 55-112, a commercially available polyether diol having a molecular weight of about 1000. The examples in this set maintain the same hard segment content and polyol to HBC component, but vary the mix of the two polyols in the polyol component. The formulations of the examples in this set are summarized in the table below, along with the results obtained from each example.

TABLE 3

Example Set 4 Formulations and Results

|  | 4-A | 4-B | 4-C | 4-D |
|---|---|---|---|---|
| HBC (g) | 18.35 | 18.50 | 18.55 | 18.60 |
| Polyol Component (g) | 34.07 | 33.91 | 33.86 | 33.81 |
| Catalyst-1 (g) | 1.36 | 1.37 | 1.37 | 1.38 |
| Caprolactam (g) | 22.31 | 22.30 | 22.30 | 22.30 |
| Catalyst-2 (g) | 3.92 | 5.92 | 3.92 | 3.92 |
| POLY G ® in Polyol Comp (wt %) | 70 | 80 | 90 | 100 |

TABLE 3-continued

Example Set 4 Formulations and Results

|  | 4-A | 4-B | 4-C | 4-D |
|---|---|---|---|---|
| Hard Segment (%) | 30 | 30 | 30 | 30 |
| Polyol/HBC Ratio (m/m) | 0.75 | 0.75 | 0.75 | 0.75 |
| $T_m$ (° C.) | 16; 58; 167 | 11; 73; 160 | 76; 162 | 76; 167 |
| HS Melting ΔH (J/g) | 11.0 | 4.4 | 5.1 | 7.3 |
| $T_c$ (° C.) | 104 | 120 | 116 | 94; 129 |
| HS Cryst ΔH (J/g) | 4.6 | 0.7 | 0.6 | 0.8 |
| $T_g$ (° C.) by DMA | −64 | −63 | −61 | −59 |

The results show that the chemical identity of the polyol component can have an impact on the crystallization of the resulting block copolymer.

Example Set 5

A set of examples is prepared and tested using the same equipment, procedures and test methods described in Example Set 2 above. However, in this example set, a different polyol component is used. These examples use a polyol blend that is a mixture of PTMG 1000, as described above, and a chain extender diol, in these examples either 1,4-butanediol (BDO) or 1,6-hexanediol (HDO). The examples in this set maintain the same hard segment content but also include some examples that vary the ratio of the polyol to HBC component with a specific polyol component. The formulations of the examples in this set are summarized in the table below, along with the results obtained from each example.

TABLE 4

Example Set 5 Formulations and Results

|  | 5-A | 5-B | 5-C | 5-D | 5-E | 5-F | 5-G | 5-H |
|---|---|---|---|---|---|---|---|---|
| HBC (g) | 19.48 | 21.54 | 23.35 | 22.16 | 22.16 | 21.27 | 21.27 | 36.83 |
| Polyol Component (g) | 32.89 | 30.74 | 28.86 | 30.45 | 30.45 | 31.18 | 31.18 | 14.53 |
| Catalyst-1 (g) | 1.44 | 1.6 | 1.73 | 2.09 | 2.09 | 1.34 | 3.34 | 2.73 |
| Caprolactam (g) | 22.28 | 22.22 | 22.17 | 22.36 | 22.36 | 22.29 | 22.29 | 21.70 |
| Catalyst-2 (g) | 3.91 | 3.9 | 3.89 | 6.93 | 4.43 | 3.92 | 5.92 | 3.81 |
| BDO wt % in Polyol Comp | 1 | 3 | 5 | 0 | 0 | 0 | 0 | 0 |
| HDO wt % in Polyol Comp | 0 | 0 | 0 | 5 | 5 | 5 | 5 | 50 |
| Hard Segment (%) | 30 | 30 | 30 | 30 | 30 | 30 | 30 | 30 |
| Polyol/HBC Ratio (m/m) | 0.75 | 0.75 | 0.75 | 0.75 | 0.75 | 0.8 | 0.8 | 0.75 |
| $T_m$ (° C.) | 23; 174 | 22; 174 | 23; 172 | 23; 179 | 23; 172 | 22; 180 | 23; 172 | 26; 140 |
| HS Melting ΔH (J/g) | 14 | 15 | 15 | 17 | 13 | 19 | 15 | 11 |
| $T_c$ (° C.) | −14; 110 | −15; 114 | −18; 112 | −11; 128 | −14; 130 | −9; 126 | −10; 109 | −25 |
| HS Cryst ΔH (J/g) | 13 | 15 | 15 | 19 | 15 | 20 | 14 | — |
| Molded Plaque Observ | Some PS | Slight PS | No PS | No PS | No PS | No PS | No PS | No PS |

The results show that the use of a chain extender diol, such as HDO or BDO, can have an impact on the crystallinity of the resulting block copolymer.

Example Set 6

A set of comparative examples is prepared and tested using the same equipment, procedures and test methods described in Example Set 2 above however, in examples 6-A and 6-B, the reaction is carried out in a single step. That is, all of the components are added to the Brabender at once, as opposed to reacting the HBC and polyol component, with a first catalyst charge, and then, after this first reaction step, adding the caprolactam and the second catalyst charge for a second reaction step. In these examples, the polyol, HBC, caprolactam, and single catalyst charge are added to Brabender at a term aperture of 140° C. The rotor speed was set to 100 rpm. Once the torque level in the machine levels off and the temperature reaches 170-180° C., the machine is stopped and the resultant material is removed and sampled. Example 6-A uses PTMG 1000 as its polyol component, while Example 6-B uses PEG 1450, a commercially available polyethylene glycol with a molecular weight of about 1450. The formulations of the examples in this set are summarized in the table below, along with the results obtained from each example.

TABLE 5

Example Set 6 Formulations and Results

|  | 6-A (1-Step Brabender) | 6-B (1-Step Brabender) |
|---|---|---|
| HBC (g) | 18.09 | 14.88 |
| Polyol Component (g) | 34.33 | 41.09 |
|  | PTMG 1000 | PEG 1450 |
| Caprolactam (g) | 22.31 | 18.56 |
| Catalyst-1 (g) | 5.26 | 5.46 |
| Catalyst-2 (g) | 0.00 | 0.00 |
| Hard Segment (%) | 30 | 25 |
| Polyol/HBC Ratio (m/m) | 0.75 | 0.75 |
| $T_m$ (° C.) | 24; 168 | 50; — |
| HS Melting ΔH (J/g) | 7.4 | — |
| $T_c$ (° C.) | — | 23; — |
| HS Cryst ΔH (J/g) | — | — |

The results show that these comparative examples do not provide the same beneficial properties in the resulting block copolymer, and more fundamentally, are not even successful at producing a usable block copolymer. The examples made by a one-step process in the Brabender did not show any crystallization peak during the DSC cooling cycle. In addition, severe phase separation was observed in these examples.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

As used herein, the term "substantially free of" means the composition contains less than 10%, 5%, 1%, 0.1% or even 0.01% percent by weight of the described material. The term may also mean that none of the described materials is intentionally present, but may be present in small and or trace amounts due to its presence in other materials as an impurity and/or byproduct.

We claim:

1. A melt processable copolyetheramide elastomer comprising:
   (a) one or more segments derived from a lactam-terminated diisocyanate and optionally at least one hydroxy-terminated compound; and
   (b) one or more segments derived from a lactam monomer comprising caprolactam;
   wherein the lactam-terminated diisocyanate used in the preparation of the elastomer contains less than 5 percent by weight residual lactam monomer.

2. The copolyetheramide elastomer of claim 1 wherein the lactam-terminated diisocyanate comprises caprolactam terminated hexamethylene diisocyanate; wherein the lactam monomer comprises caprolactom; and wherein the hydroxy-terminated compound comprises poly(tetramethylene oxide).

3. The copolyetheramide elastomer of claim 1 wherein the hydroxy-terminated compound used in the preparation of the elastomer comprises polytetramethylene ether glycol having a number average molecular weight of no more than 2000.

4. The copolyetheramide elastomer of claim 3 wherein the hydroxy-terminated compound is at least 30 percent by weight polytetramethylene ether glycol.

5. The copolyetheramide elastomer of claim 1 wherein the elastomer is prepared by polymerizing (i) a lactam-terminated diisocyanate, (ii) a lactam monomer comprising caprolactam, and (iii) a hydroxy-terminated compound and/or derivatives thereof, optionally in the presence of a catalyst; wherein the polymerization takes place in an internal mixing apparatus; and
   wherein the molar ratio of the hydroxy-terminated compound to the lactam-terminated diisocyanate used in the polymerization is from 0.50 to 0.95.

6. The copolyetheramide elastomer of claim 1 wherein the elastomer is obtained by polymerizing:
   (A) said lactam-terminated diisocyanate; and
   (B) said hydroxy-terminated compound comprising a polyether, a polyester, a polycarbonate, a polycaprolactone or combinations thereof, wherein the hydroxy-terminated compound has a number average molecular weight (Mn) from 200 to 10,000;
   wherein the polymerization is optionally carried out in the presence of a catalyst; and wherein the resulting intermediate is further polymerized with:
   (C) said lactam monomer;
   optionally in the presence of a metal-containing caprolactamate catalyst.

7. The copolyetheramide elastomer of claim 1 wherein the lactam-terminated diisocyanate comprises an alkylene diisocyanate terminated with caprolactam, laurolactam, or a combination thereof.

8. The copolyetheramide elastomer of claim 1 wherein the lactam-terminated diisocyanate is derived from: hexamethylene diisocyanate; 3,3'-dimethylbiphenyl-4,4'-diisocyanate; m-xylylene diisocyanate; naphthalene-1,5-diisocyanate; diphenylmethane-3,3'-dimethoxy-4,4'-diisocyanate; toluene diisocyanate; isophorone diisocyanate; 1,4-cyclohexyl diisocyanate; decane-1,10-diisocyanate; dicyclohexylmethane-4,4'-diisocyanate; methylenedicyclohexyl diisocyanate; or combinations thereof.

9. The copolyetheramide elastomer of claim 1 wherein the hydroxy-terminated compound comprises a polyether diol of the general formula $HO-(RO)_n-H$ wherein R is a hydrocarbyl group containing from 1 to 20 carbon atoms and n is an integer from 1 to 50.

10. The copolyetheramide elastomer of claim 6 wherein the polyether diol comprises polytetramethylene ether glycol and may optionally further comprise polyethylene glycol, polypropylene glycol, poly(trimethylene ether)glycol, copolymers of two or more of said diols, or combinations thereof.

11. The copolyetheramide elastomer of claim 6 wherein the polymerization further includes a chain extender.

12. The copolyetheramide elastomer of claim 1 wherein the lactam-terminated diisocyanate comprises caprolactam-terminated hexamethylene diisocyanate, caprolactam-terminated dicyclohexylmethane diisocyanate, caprolactam-terminated toluene diisocyanate, or combinations thereof;
   wherein the lactam monomer comprises caprolactam, laurolactam or combinations thereof; and
   wherein the hydroxy-terminated compound comprises polytetramethylene ether glycol.

13. A composition comprising the copolyetheramide elastomer of claim 1 and further comprising one or more performance additives;
   wherein the performance additives comprise opacifying pigments, colorants, mineral and/or inert fillers, stabilizers including light stabilizers, lubricants, UV stabilizers, processing aids, antioxidants, anti-ozonates, nanoparticles, nanotubes, impact modifiers, flame retardants, conductive polymers, static dissipative materials, and combinations thereof.

14. A process of preparing a melt processable copolyetheramide elastomer comprising the steps of:
   I. polymerizing (A) a lactam-terminated diisocyanate, (B) a lactam monomer comprising caprolactam, and optionally (C) a hydroxy-terminated compound, optionally in the presence of a catalyst;
   wherein the polymerization takes place in an internal mixing apparatus;
   wherein the lactam-terminated diisocyanate used in the preparation of the elastomer contains less than 5 percent by weight residual lactam monomer.

15. The process of claim 14 wherein the lactam-terminated diisocyanate comprises caprolactam terminated hexamethylene diisocyanate; and wherein the hydroxy-terminated compound comprises poly(tetramethylene oxide).

16. The process of claim 14 wherein the internal mixing apparatus comprises one or more extruders; and
   wherein the process optionally further comprises the step of removing any residual lactam monomer from the resulting copolyetheramide elastomer composition.

17. The process of claim 16 wherein the internal mixing apparatus comprises one or more twin screw extruders.

18. A shaped polymeric article comprising a melt processable copolyetheramide elastomer comprising:
   (a) one or more segments derived from a lactam-terminated diisocyanate and optionally at least one hydroxy-terminated compound; and
   (b) one or more segments derived from a lactam monomer comprising caprolactam;
   wherein the lactam-terminated diisocyanate used in the preparation of the elastomer contains less than 5 percent by weight residual lactam monomer.

19. The article of claim 18 wherein the lactam-terminated diisocyanate comprises caprolactam terminated hexamethylene diisocyanate; wherein the lactam monomer comprises caprolactam; and wherein the hydroxy-terminated compound comprises poly(tetramethylene oxide).

* * * * *